United States Patent
Rozenman et al.

(10) Patent No.: US 7,701,877 B1
(45) Date of Patent: Apr. 20, 2010

(54) METHODS AND APPARATUS FOR REPRESENTING AND QUERYING STORAGE AREA NETWORK (SAN) TOPOLOGY

(75) Inventors: Vitaly Rozenman, Shrewsbury, MA (US); Benjamin Bushoy, Newton, MA (US); Dmitry Gritsay, Boxborough, MA (US)

(73) Assignee: EMC Corporation, Hopkinton, MA (US)

( * ) Notice: Subject to any disclaimer, the term of this patent is extended or adjusted under 35 U.S.C. 154(b) by 401 days.

(21) Appl. No.: 11/529,038

(22) Filed: Sep. 28, 2006

(51) Int. Cl.
*H04L 12/28* (2006.01)
(52) U.S. Cl. .................. 370/254; 370/255; 370/257
(58) Field of Classification Search .......... 370/254, 370/255, 257
See application file for complete search history.

(56) References Cited

U.S. PATENT DOCUMENTS

| | | | | |
|---|---|---|---|---|
| 5,202,985 A | * | 4/1993 | Goyal ........................ 707/4 |
| 5,606,669 A | * | 2/1997 | Bertin et al. ................ 709/223 |
| 5,910,803 A | * | 6/1999 | Grau et al. .................. 715/734 |
| 6,976,087 B1 | * | 12/2005 | Westfall et al. ............. 709/238 |
| 2002/0120770 A1 | * | 8/2002 | Parham et al. .............. 709/238 |
| 2002/0161751 A1 | * | 10/2002 | Mulgund et al. ............ 707/3 |
| 2003/0093509 A1 | * | 5/2003 | Li et al. ..................... 709/223 |

* cited by examiner

*Primary Examiner*—Dang T Ton
*Assistant Examiner*—Robert M Morlan
(74) *Attorney, Agent, or Firm*—Chapin IP Law, LLC

(57) ABSTRACT

A topology representation stores the topology in database tables corresponding to a topology schema for representing the manageable entities and relations in the SAN. A management application performs topology manipulations via database queries operable to process the database tables representing the topology, thus avoiding loading the entire topology into memory. Accordingly, configurations herein need not store the entire topology representation in order to process the topology by performing relational database queries that effectively perform the topology processing via the database query engine rather than a memory resident data structure.

19 Claims, 7 Drawing Sheets

| NODE_ID | REMOTE_NODE_ID | NAME |
|---|---|---|
| 250 | 251 | A |
| 251 | 250 | B |
| 250 | 252 | A |
| 252 | 250 | C |
| 251 | 252 | B |
| 252 | 251 | C |
| 252 | 253 | C |
| 254 | 253 | E |
| 253 | 252 | D |
| 253 | 254 | D |

US 7,701,877 B1

METHODS AND APPARATUS FOR REPRESENTING AND QUERYING STORAGE AREA NETWORK (SAN) TOPOLOGY

BACKGROUND

In a storage area network (SAN), a SAN management application monitors and manages manageable entities in the SAN. Each of the manageable entities is a component, or resource, deployed with other SAN components in a particular configuration. The manageable entities include storage arrays, connectivity devices, and hosts. Typically, software entities known as agents execute on the hosts for gathering, reporting, and monitoring the manageable entities in the SAN. The manageable entities are responsive to the agents for reporting various status metrics back to the agents and receiving control information from the agents. A management server executes the SAN management application, and oversees the agents. The management server is responsive to a console having a graphical user interface (GUI) for receiving and displaying operator parameters with a SAN operator.

In general, therefore, the storage area network (SAN) is a collection of data storage systems that are networked via a switching fabric to a number of host computer systems operating as data servers for user access. In a large storage area network, the interconnections between the manageable entities may become numerous and complex. A discovery operation identifies the topology of the SAN so that the management application may identify, manipulate, and report on each of the manageable entities and interconnections in the SAN. The management application, therefore, maintains the topology representation to enable a SAN operator to interactively provide direction to and receive feedback on SAN operation via an operator console.

SUMMARY

A storage area network (SAN) includes many interconnected components for providing mass data storage and retrieval services. The components, also known as nodes, include storage arrays, switching devices, and hosts, and are interconnected in a SAN fabric of interconnections. The SAN management application maintains the topology of the SAN in a data structure operable to identify each of the components, or nodes, and the relations between them. The nodes are individual manageable entities responsive to the management application, and include network devices such as the storage arrays, switching devices, and hosts, as well as hardware and software components such as disks, ports, agents, adaptors, and other included manageable entities. The relations represent associations between the manageable entities, such as physical interconnections and inclusions (i.e. a storage array includes disk drives, a switching device has ports and adaptors, etc.). In a large SAN, therefore, the representation of the topology may require substantial computational resources.

Therefore, conventional topology identification and representation schemes suffer from the shortcoming that substantial memory may be required to represent all manageable entities and corresponding relations. In a sufficiently large SAN, the SAN management application may be unable to load the entire topology representation for querying from the operator console. Accordingly, configurations discussed herein substantially overcome the shortcomings of conventional topology representation schemes by storing the topology representation in database tables corresponding to a topology schema for representing the manageable entities and relations in the SAN. The management application performs topology manipulations via database queries operable to process the database tables representing the topology, thus avoiding loading the entire topology into memory. Accordingly, configurations herein need not store the entire topology representation in order to effectively process the topology by performing relational database queries that effectively perform the topology processing via the database query engine rather than a memory resident data structure.

An example configuration provides a topology service focused on providing an efficient solution for storing, calculating and retrieving of the topology objects as the repository content. The topology service provides flexibility and scalability in terms of types of the stored topologies, as well as the amount of topology data that may be efficiently stored and processed. Therefore, an example configuration implements the service in a relational DB having the ability to process large amounts of data which may not be feasible to load into memory all at the same time. A particular arrangement provides Java/C++ friendly APIs, low maintenance cost and limits restrictions for future upgrades and patching. It maintains flexibility to support frequent topology changes, as well as to remain adaptable to the specific application needs.

In further detail, the method of querying large networks as defined herein includes defining a set of tables indicative of node and relation structures, and discovering a network of interconnected nodes to identify manageable entities in the network and relations between the manageable entities. The discovery is for populating the defined set of tables to generate a topology of the network, and a query processor traverses the topology by processing a query of the defined set of tables, such that the traversal avoids simultaneous memory residence of the representations of interconnected manageable entities. In an example configuration, populating the tables enumerates each of the nodes found, and enumerates a relation table indicative of a relation between each of the enumerated nodes.

The tables therefore define a topology of network nodes, in which each of the nodes may have one or more links to another node, and each link denotes an identified relation between manageable entities. Populating the tables further includes identifying, for a particular node, a type of node, and computing relations to other nodes from the particular node. A topology processor identifies connections from the particular node to other nodes, in which each relation defines a connection, and determines, for each identified connection, a type of the connection.

In an example configuration discussed further below, the network is a storage area network (SAN) and nodes define manageable entities in the SAN, such that the manageable entities include storage devices, connectivity devices, and host devices. A discovery traversal further includes identifying a particular node as one of a storage device, connectivity device and host device, computing other manageable entities connected to the identified node, and storing an entry in the relation table for each of the computed connections. Other tables may be included, such that topology discovery includes storing the nodes as node entries in a table, storing the relations as link entries in a table, classifying the node entries in a node type table, and classifying the link entries in a link type table. The link entries are indicative of a directional association between the node entries, such that the node entries and link entries collectively depict a storage area network topology responsive to a query based on the tables.

A user query invokes the query processor to traverse the topology responsively to the query, and includes receiving a template indicative of at least one query, in which each query corresponds to a particular set of relations defined by at least one of the entries in the link type table. The query processor receives match values indicative of a set of inputs, such as from a GUI or command line, in which the queried results are indicative of at least one of nodes and relations defined in the topology, and the match values are operable for comparison with values in the set of tables. The query processor employs the match values in the template for identifying corresponding values in the table, typically via SQL statements, and performs the queries in the template to compute a result set of table entries, such that the result set is indicative of a set of nodes and relations responsive to the query.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In a storage area network, a SAN management application maintains the topology of the SAN in a data structure operable to identify each of the components, or nodes, and the relations between them. The nodes are individual manageable entities responsive to the management application, and include network devices such as storage arrays, switching devices, and hosts, as well as hardware and software components such as disks, ports, agents, adaptors, and other included manageable entities. The relations represent associations between the manageable entities, such as physical interconnections, and inclusions (i.e. a storage array includes disk drives, a switching device has ports and adaptors, etc.). In a large SAN, therefore, the representation of the topology may require substantial computational resources.

Therefore, conventional topology identification and representation schemes may suffer from the shortcoming that substantial memory may be required to represent all manageable entities and corresponding relations. In a large SAN, the SAN management application may be unable to load the entire topology representation for querying from the operator console. Accordingly, configurations discussed herein substantially overcome the shortcomings of conventional topology representation schemes by storing the topology representation in a database table corresponding to a topology schema for representing the manageable entities and relations in the SAN. The management application performs topology manipulations via database queries operable to process the database tables representing the topology, thus avoiding loading the entire topology into memory. Accordingly, configurations herein need not store the entire topology representation in order to effectively process the topology by performing relational database queries that effectively perform the topology processing via the database query engine rather than a memory resident data structure.

An example configuration provides a topology service focused on providing an efficient solution for storing, calculating and retrieving of the topology objects as the repository content. The topology provides flexibility and scalability in terms of types of the stored topologies, as well as the amount of topology data that may be efficiently stored and processed. Therefore, an example configuration implements the service in a relational DB having the ability to process a large amount of data which may not be feasible to load into memory all at the same time. A particular arrangement provides Java/C++ friendly APIs, low maintenance cost and limits restrictions for future upgrades and patching.

Figure 1:
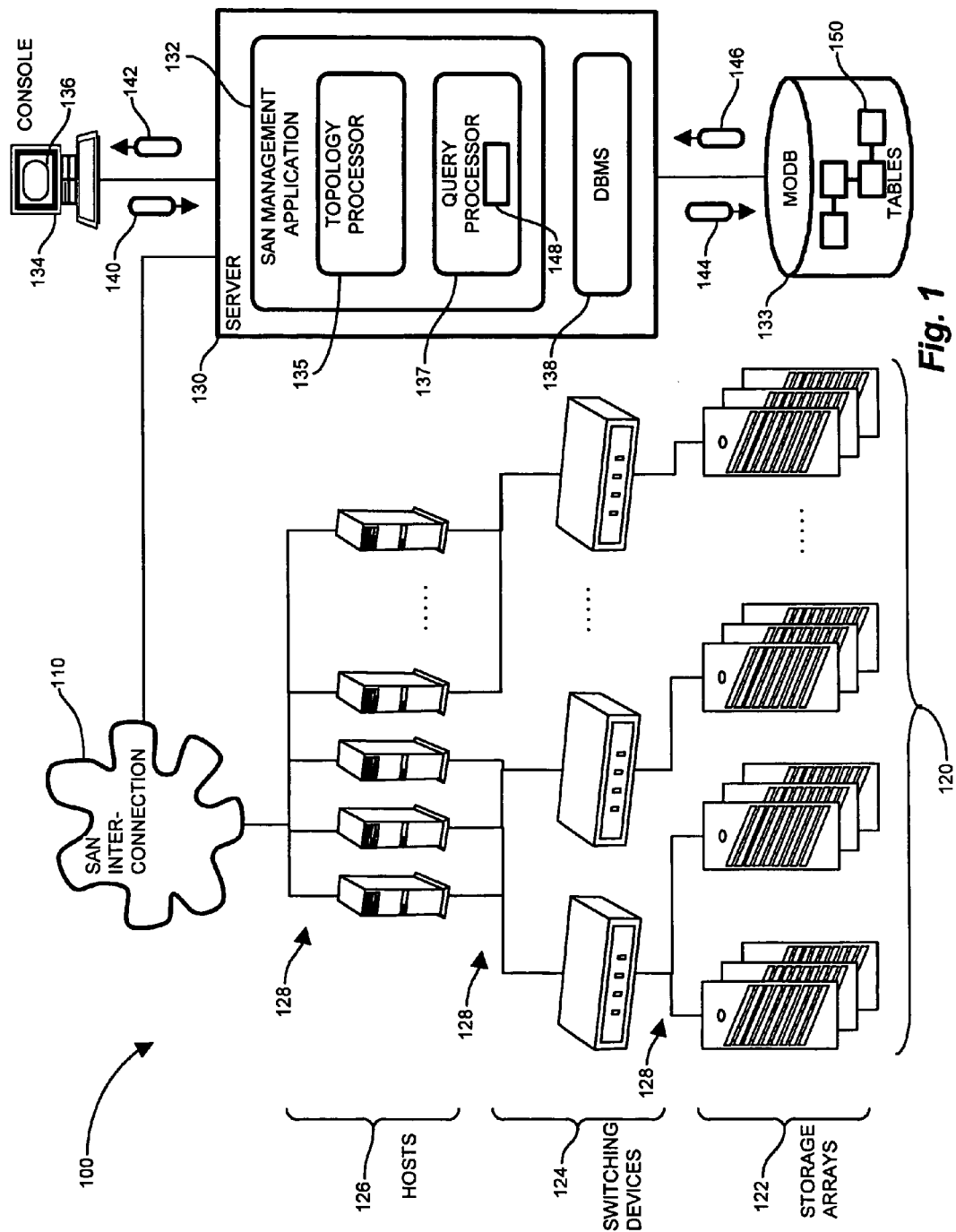
FIG. 1 is a context diagram of an exemplary managed information environment suitable for use with the present invention.

FIG. 1 is a context diagram of an exemplary managed information environment suitable for use with the present invention. Referring to FIG. 1, in a managed information environment 100, a storage area network 110 interconnects a plurality of manageable entities 120 in the storage area network 110. The manageable entities 120 include SAN nodes, such as storage arrays 122, switching devices 124, and hosts 126. The manageable entities 120 couple to a server 130 via the SAN 110 interconnection. The server 130 includes a management application 132 responsive to an operator console 134 for exchanging commands and feedback concerning the manageable entities 120 in the SAN. Each of the SAN nodes, or manageable entities 120 have relations defined by connections 128 to other manageable entities 120. Further, additional manageable entities 120 included within the SAN nodes 112 also exhibit such relations. Such relations include, for example, disk drives within storage arrays 122, front end (FE) adaptors on switching devices 124, and ports. A topology processor 135 traverses the network to discover manageable entities and populate the tables 150. Other relations exist between the various manageable entities 120 interconnected via the SAN 110, and are discoverable and controllable by the management application 132.

As indicated above, in a large SAN 110, the number of manageable entities 120, and accordingly, the number of relations 128, can be substantial. However, the management application 132 is operable to discover and manage each manageable entity 120 in the SAN 110. The management application 132 stores the discovered relations, as well as entries for each of the manageable entities 120, in a managed object database 133 (MODB). The managed object database 133 includes a set of tables 150 defining the manageable entities 120 and associated relations 128. A graphical user interface 136 is invokable from the console 134 for querying the managed object database 133. The management application 132 responds to queries 140 from the operator console by computing a result 142 and transmitting the result 142 to the console 136 for display. However, loading database entries corresponding to each manageable entity 120 and relation 128 (connection or other relation) may be computationally intensive.

Accordingly, the management application generates a query request 144, including match values derived from the query 140, and issues database commands, typically SQL statements, to the managed object database 133. A database management system (DBMS) 138, integrated with the database 133 and external from the management application 132, processes the query 144 request by issuing the SQL statements as a query 144. The executed query produces a query result 146 by traversing the database tables 150 defining the manageable entities 120 and relations 128. In this manner, the management application 132 processes an operator query request 140 concerning a large number of manageable entities 112 and relations 128 by invoking a query processor 137 to generate a SQL query 144, directed to database tables 150 having entries corresponding to the manageable entities 120 and associated relations 128, without loading data structures or objects corresponding to every relation 128 and manageable entity 120 considered in processing the query 144.

Figure 2:
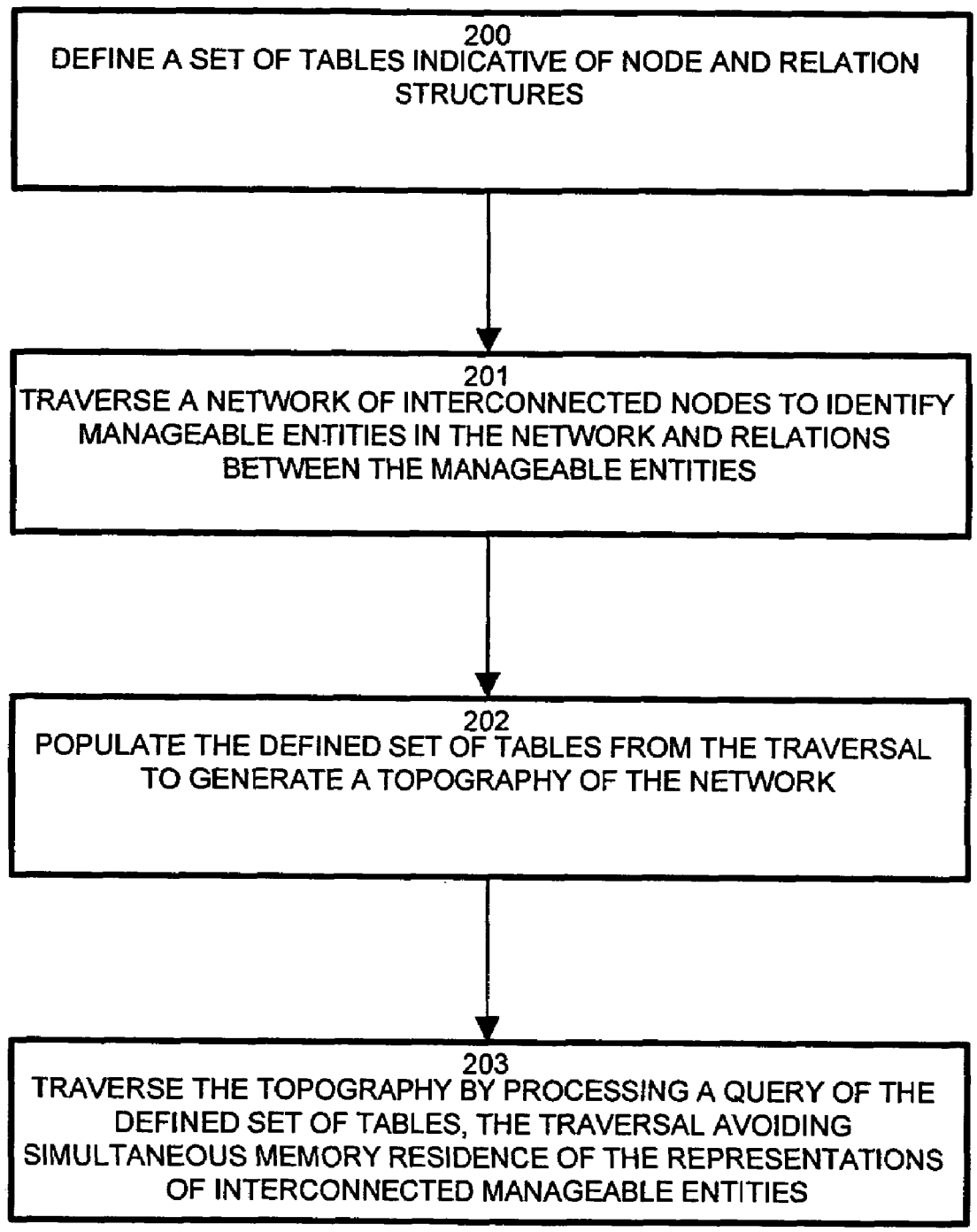
FIG. 2 is a flowchart of SAN topology definition in the environment of FIG. 1.

FIG. 2 is a flowchart of SAN topology definition in the environment of FIG. 1. Referring to FIGS. 1 and 2, the method of querying large network topologies as disclosed herein includes, at step 200, defining a set of tables indicative of node and relation structures, and traversing a network of interconnected nodes to identify manageable entities 120 in the network 110 and relations 128 between the manageable entities 120, as depicted at step 201. From the traversal, the management application 132 discovers manageable entities 120 in the SAN to populate the defined set of tables 150 from the traversal and generate a topology of the network, as shown at step 202. The management application 132 then traverses the topology by processing a query 144 of the defined set of tables 150, such that the traversal avoids simultaneous memory residence of the representations of interconnected manageable entities 120. In this manner, performing a query by employing data base tables rather than a memory resident data structure representing the topology allows queries of large SAN installations without employing exhaustive memory resources.

Figure 3:
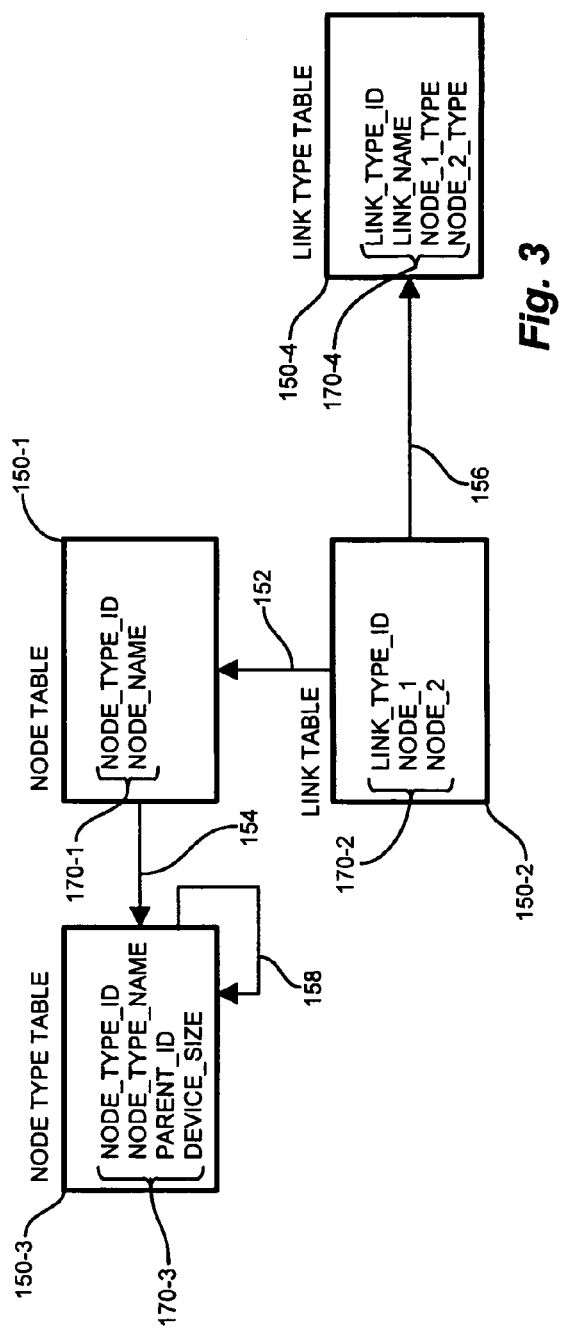
FIG. 3 is a database entity diagram operable to store the topology of FIG. 2.

FIG. 3 is a database entity diagram operable to store the topology of FIG. 1 for processing according to FIG. 2. Referring to FIGS. 1-3, the managed object database 133 includes a plurality of tables 150-1 . . . 150-4 (150, generally), in an example configuration. The tables 150 include a node table 150-1, a node type table 150-3, a link table 150-2 and a link type table 150-4. In general, the node table 150-1 depicts the manageable entities 120 in the SAN 110, and the link table 150-2 depicts relations between the manageable entities 120 such as those depicted by connections 128. The node type table 150-3 indicates the type of manageable entity 120, such as storage array 122, connectivity device 124 or host 126, and the link type table 150-4 indicates the type of relation 128. Each type of relation is identified by the types of nodes it connects. Because link definition is based on the definition of the nodes, nodes can be transformed to links and vice versa. Such ability provides flexibility of implementing efficient topology-related operations.

For the example SAN topology, each link may have a bi-directional nature or can be "one way" connection. Bi-directional links between nodes A and B will be connecting A with B as well as B with A. "One way" connection between nodes A and B can allow only B to be connecting with A due to special intended SAN settings for some network elements, like networks with firewalls. To reflect direction of the links, each link is represented as pair of records (FIG. 9, below) if the link is bi-directional and as one record if link is the "one way" connection. Such representation of the links allows design direction-aware topology algorithms without complicated logical operations related to determination of the direction of the processed links. The example traversals read links from left to right to ensure that processed links have correct direction. Also, such a method of representing links removes complexities related to topology traversals with a randomly chosen starting point, for example, if there are only two nodes A and B and only one link between them presented as A B, then in a traversal request going from A to B, the traversal compares the link A B as "first node in link"="start point" to retrieve B. In contrast, for a traversal request going from B to A, the traversal compares link A B as "second node in link"="start point" to get A. Therefore, to allow an application to request topology traversal using any topology node as a start point, traversal operation would be burdened to implement complex logical operations merely to determine if A B must be navigated as A→B or as B→A. Presentation of the each link as unidirectional records A B and B A removes the above problems related to direction of the links. When a traversal is started from A, the A B record will be processed, however when a traversal is started from B, the B A record will be processed.

Each of the tables 150-1 . . . 150-4 includes entries having attributes 170-1 . . . 170-4, containing information about the manageable entity and requestable by query requests 140. Each entry 170 in the relation table 150-2 identifies two entries 170 in the node table 150-1 associated by the particular relation, as shown by arrow 152. Each node (manageable entity) 120 has a type and other information in the node type table 150-3, shown by arrow 154, and each relation (connection) 128 has a type and other information in the link type table 150-4, shown by arrow 156. Further, the node type table 150-3 may indicate hierarchical relations between manageable entities 120, shown by arrow 158, such as disk drives included in a storage array 122, for example. The query 144 includes SQL commands for traversing these tables 150 to generate the desired query output (i.e. report) 146, thus effectively traversing the SAN topology using the DBMS 138 as a query engine.

Figure 4:
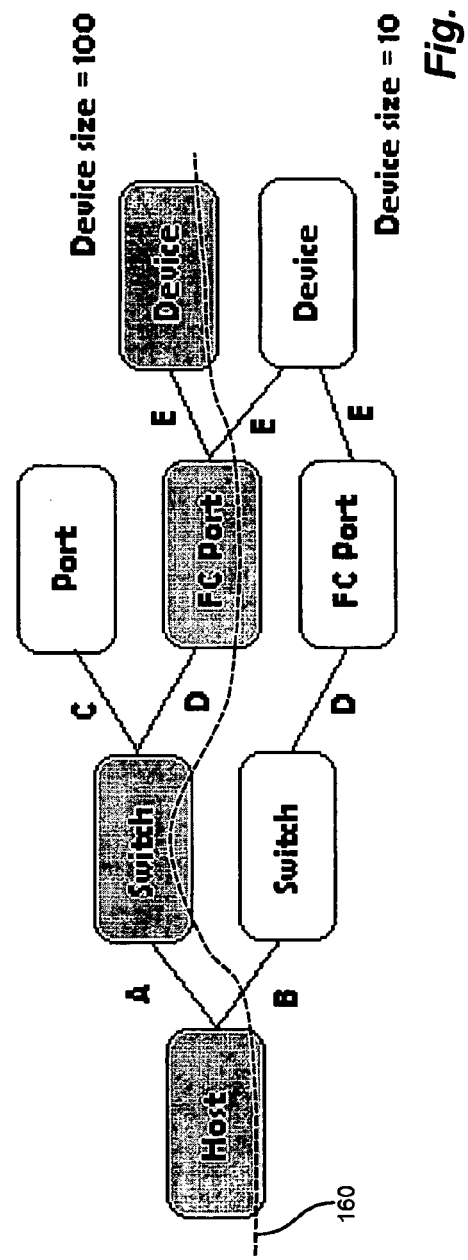
FIG. 4 is an exemplary traversal in the database of FIG. 3.

FIG. 4 is an exemplary traversal in the database of FIG. 3. In an example configuration, the disclosed topology service provided by the query processor 137 supports a set of predetermined templates 148. Alternate templates are definable to support other topology arrangements. The example templates 148 include:

I/O Path Traversal—checking if any two nodes are connected within a topology

Connectivity Check—checking if any two nodes are connected within a topology

Shortest Path—finding the shortest path between any two nodes within a topology

All Paths—retrieval of all possible paths between two nodes within a topology

The I/O Path Traversal method is a specially designed for storage management needs assessment. The disclosed method allow a query 144 to define a topology traversal pattern (template) 148 in terms of link types and perform traversal of the topology using that predefined pattern as a topology navigation rule. In other words, an I/O Path Traversal template 148 can traverse the topology using predetermined selected types of links 128 between selected types of nodes 120. Also, it allows exclusion of nodes 120 from the traversal process by applying predefined conditions on the object attributes of the objects represented by these nodes 120.

The Connectivity Check and Shortest Path templates utilize a similar method and differ only by the interface by exposed to the client, because in fact the connectivity check invokes checking if the path between the two nodes 120 exists.

Referring to FIG. 4, disclosed is an execution of an I/O Traversal Path based on an abstract graph breath-first search (BFS) traversal and implemented via a query 144 as an SQL procedure. On any given traverse step, the I/O Traversal Path traversal considers only types of links which were described in the traverse template 148 for that specific traverse operation. Referring to FIGS. 1 and 4:

A, B, C, D, E are types of links 150-4

Host, Switch, Port, FC Port, Device are types of nodes 120, 150-3

Device size is an attribute 170-3 of the device

The Desired I/O path is marked by the dotted line 160. To perform the I/O path traversal as shown in FIG. 4, an I/O Traversal Path traversal employs a traversal template 148 as:

Node_Type=Host, Link_Type=A, Link_Type=D, Link_Type=E, Device Size=?

Once the topology navigation template 148 is stored it can be reused as many times as the SAN management application 132 need perform topology traversal using a similar navigation pattern, but using different values for filtering attributes 170. In the example in FIG. 4, a filtering attribute is the size of device 170-3. Using same template 148, the application can traverse topology to devices with size=100 or to devices with size=10 or another size value by specifying alternate run-time filtering values for the same template 148. The I/O Traversal Path template 148 supports various combinations of the link type 150-4 and node type 150-3 filtering attribute specific refinements for the type of comparison operations.

Figure 5:
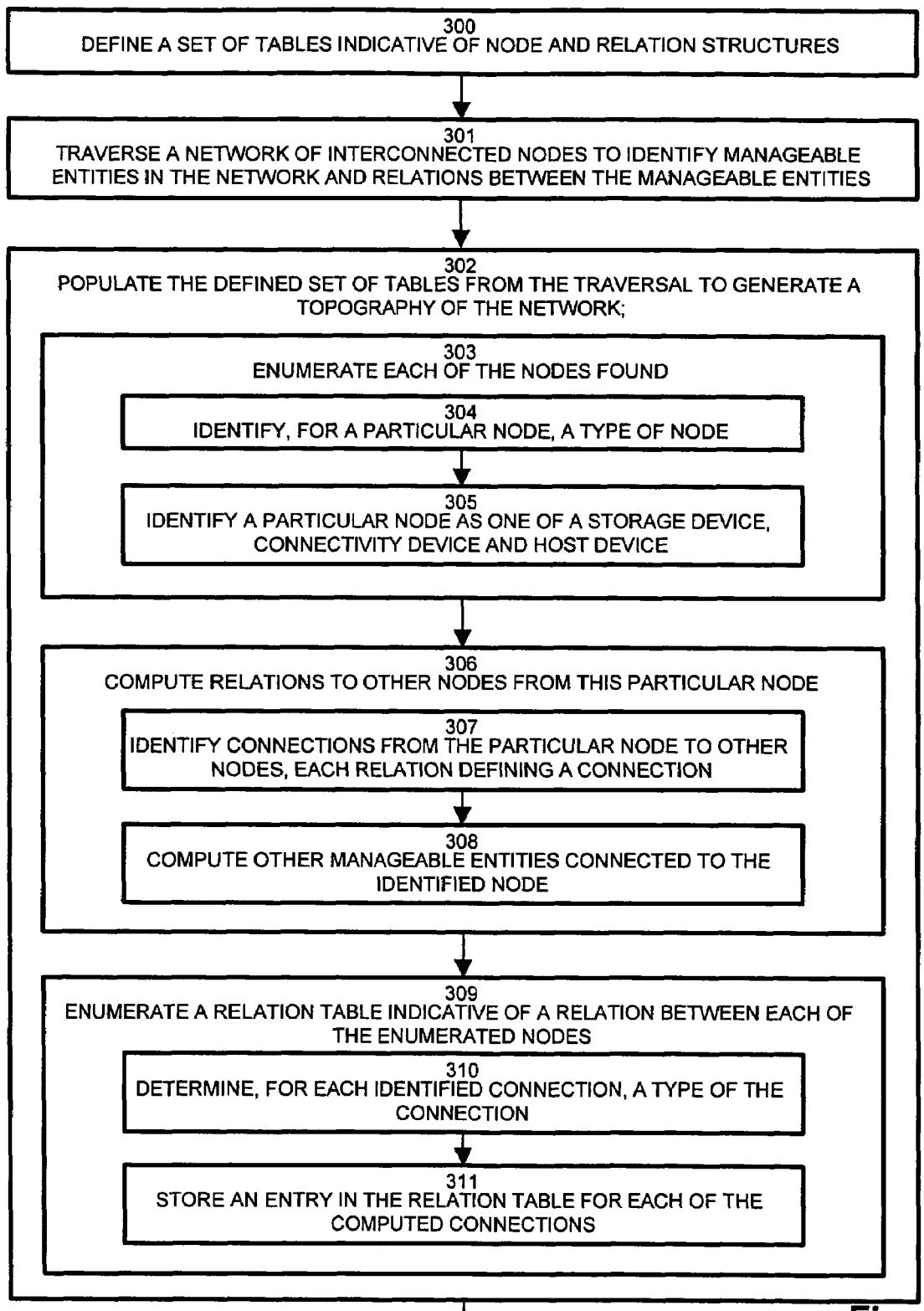
FIGS. 5-7 are a flowchart of query processing employing the topology of FIG. 3.
Figure 6:
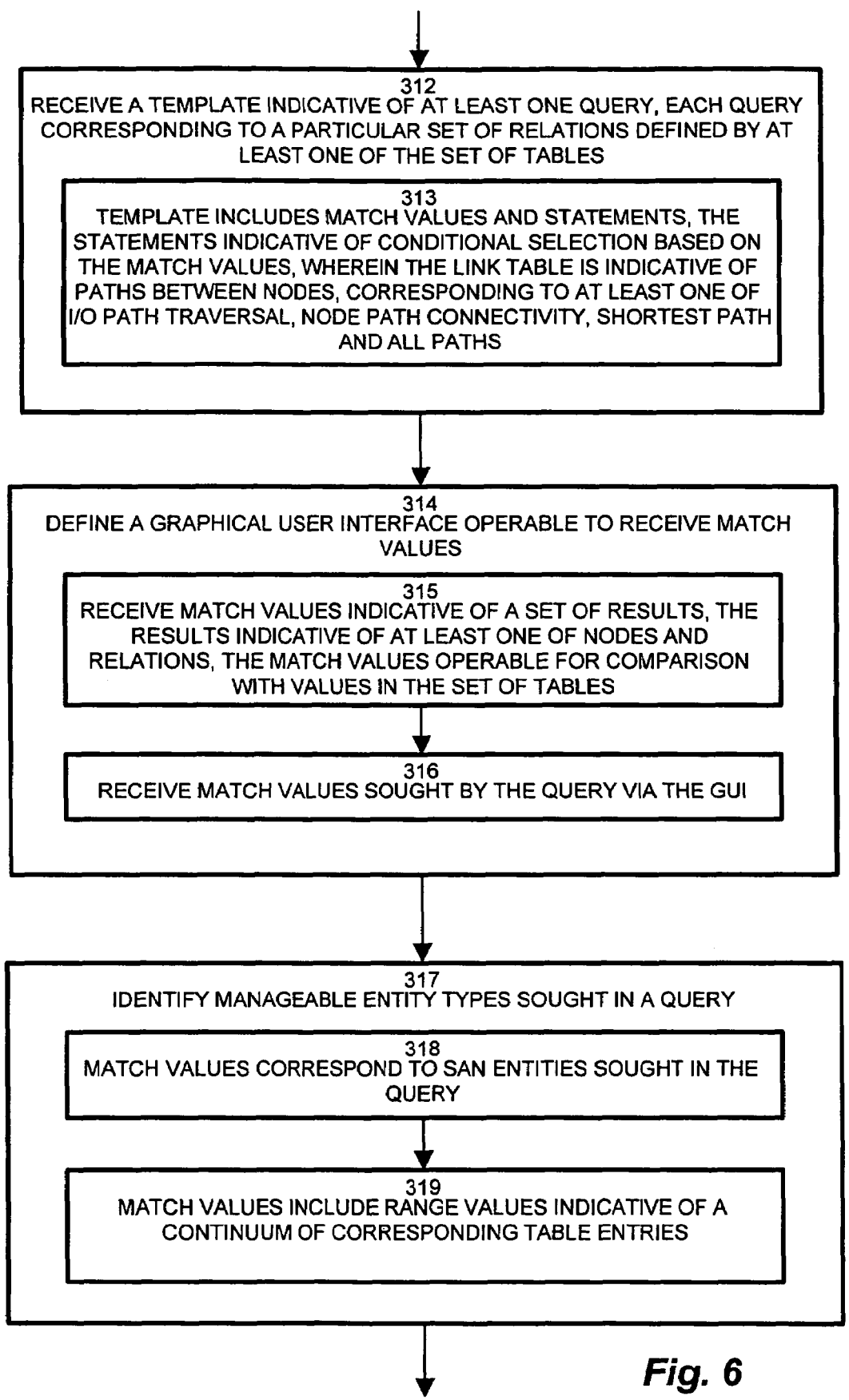
Figure 7:
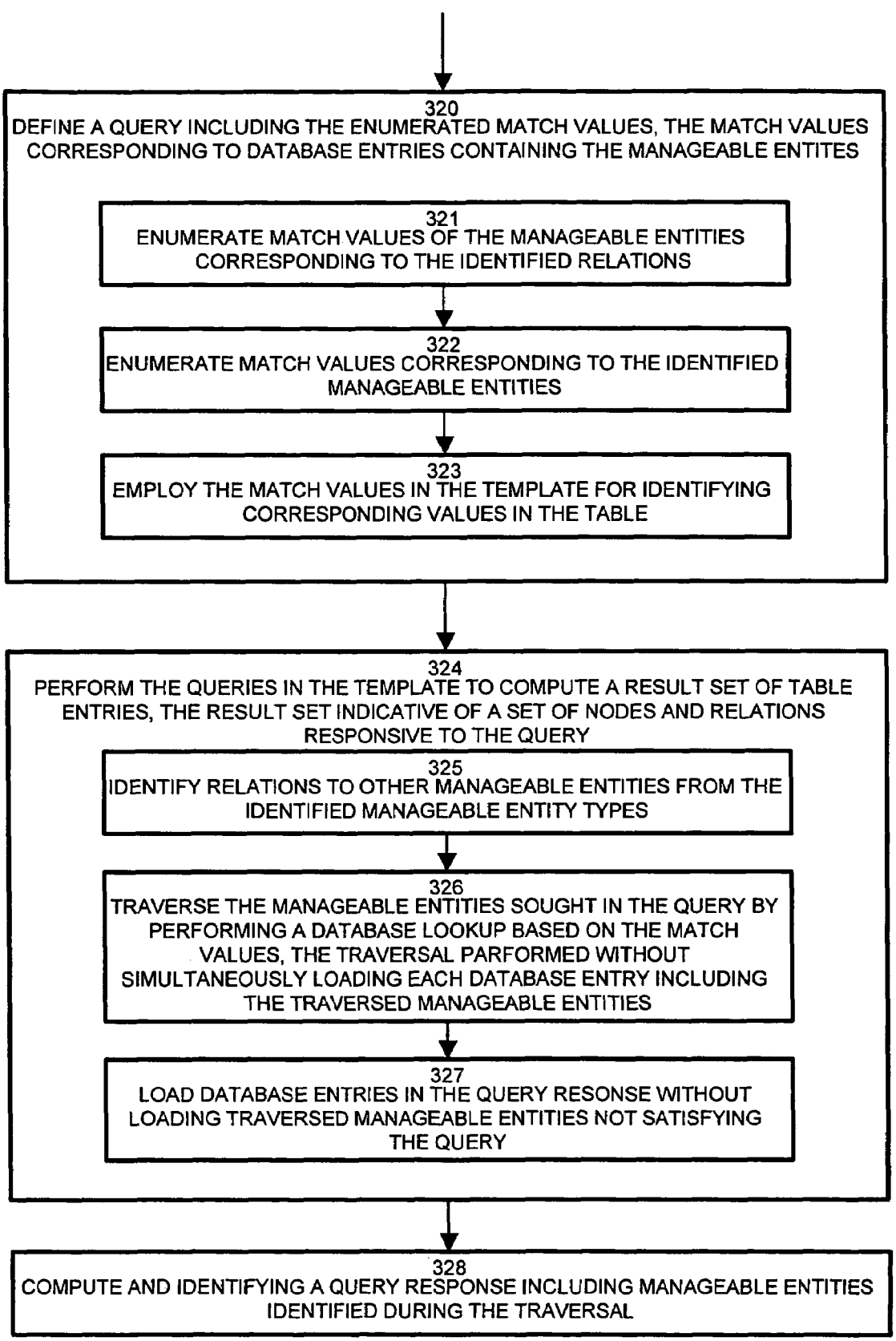

FIGS. 5-7 are a flowchart of query processing employing the topology framework of FIG. 3. Referring to FIGS. 1 and 5-7, at step 300 the topology processor 135 defines a set of tables (i.e. schema) indicative of node and relation structures, such that wherein the tables define a topology of nodes in a storage area network, in which each of the nodes has at least one link to another node, and each link denoting an identified relation between manageable entities. The topology processor 135 traverses a network of interconnected nodes to identify manageable entities in the network and relations between the manageable entities, as depicted at step 301, to discover available manageable entities 120 and corresponding relations 128. In the example configuration, the network is a storage area network (SAN) 110 and nodes define manageable entities in the SAN, in which the manageable entities 120 including storage devices 122, connectivity devices 124, and host devices 126. Generally, manageable entities 120 are a SAN component manageable from the management application, and include "top level" (node) manageable entities, as well as "included" manageable entities, such as disk drives within storage arrays, and ports or fiber channel (FC) adaptors included in switching devices, for example. Relations may exists between any manageable entity, such as a switch 124 attached to a storage array 122, as well as the disk drives (not specifically shown) included in the storage array 122.

The topology processor 135 populates the defined set of tables 150 from the traversal to generate a topology of the network, as disclosed at step 302. At step 303, populating the tables includes enumerating each of the nodes 120 found. The topology processor 135 identifies, for a particular node 120, a type of node, as depicted at step 304, and identifies the particular node as one of a storage device 122, connectivity device 124 or host device 126, as shown at step 305. The topology processor 135 computes relations to other nodes 120 from this particular node 120, as depicted at step 306, which includes identifying connections 128 from the particular node to other nodes, such that each relation defines a connection (step 307), and computes other manageable entities 120 connected to the identified node 120 (step 308). The topology processor 135 enumerates a relation table 150-2 indicative of a relation 128 between each of the enumerated nodes 120, as depicted at step 309, including determining, for each identified connection 128, a type of the connection 150-4, as disclosed at step 310, and storing an entry in the relation table 150-2 for each of the computed connections 128, as shown at step 311.

Therefore, the topology processor 135 stores the nodes 120 as node entries 170-1 in a table 150-1, stores the relations 128 as link entries 170-2 in a table 150-2, classifies the node entries 170-3n a node type table 150-3, and classifies the link entries 170-4 in a link type table 150-4, such that the link entries are indicative of a directional association between the node entries, and the node entries and link entries collectively depict a storage area network topology are responsive to a query 144 based on the tables 150. Therefore, a SAN operator may issue a query request 140 (discussed further below), and the query processor 137 computes the query response 142 by traversing the defined set of database tables 150. Such a traversal avoids simultaneous memory residence of the representations of interconnected manageable entities 120, relieving the management application 132 of the memory burden otherwise associated with a large query.

Once the topology is discovered and stored in the tables 150, the console 134 issues a query request 140, and the query processor 137 traverses the topology responsive to the query 144. A set of query templates 148 includes predetermined SQL statements and is receptive to match values, typically entered via the GUI 136 or an equivalent command line interface. The managed object database 133 receives a template 144 indicative of at least one query 140, such that each query 140 corresponds to a particular set of relations 128 defined by at least one of the set of tables 150, as shown at step 312. The template 148 includes match values and statements, in which the statements are indicative of conditional selection based on the match values, such that the link table 150-2 is indicative of paths 128 between nodes 120 of a query 144 corresponding to at least one of I/O path traversal, node path connectivity, shortest path and all paths, as depicted at step 313.

In the example arrangement, processing the query includes 144, at the management application 132 defining a graphical user interface (GUI) 136 operable to receive match values, as disclosed at step 314. The received match values are indicative of a set of results 146 (i.e. query response), in which the results are indicative of at least one of nodes 120 and relations 128, in which the match values are operable for comparison with values in the set of tables 150, as shown at step 315. Thus, the query processor 137 receives match values sought by the query 144 via the GUI 136, as depicted at step 316. Therefore, processing the query 144 includes identifying manageable entity types 150-3 sought in the query 144 (step 317), such that the provided match values 140 correspond to SAN entities 120 sought in the query 144, as disclosed at step 318. The match values may include range values indicative of a continuum of corresponding table entries, as depicted at step 319, such as a range of storage array IDs indicating a particular set of storage arrays 122, for example.

As a result, the query processor 137 defines a query 144 including the enumerated match values, such that the match values correspond to database entries 170 containing information on the manageable entities 120 sought by the query 144, as shown at step 320. Accordingly, the query processor 137 enumerates match values corresponding to the identified relations 128, as depicted at step 321, and also enumerates match values corresponding to the identified manageable entities 120, as shown at step 322. Therefore, the query processor 137 employs the match values in the template 148 for identifying corresponding values in the tables 150, as shown at step 323. In the exemplary configuration, the match values 140 obtained from the user via the GUI 136 are inserted as the match values in the query 144 for matching against the fields 170 in the database tables 150.

The DBMS 138 performs the queries 144 in the template 148 to compute a result set 146 of table entries 170, such that the result set 146 is indicative of a set of nodes 120 and relations 128 responsive to the query 140 issued by the user, as depicted at step 324. The DBMS 138 identifies relations 128 to other manageable entities 120 from the identified manageable entity types 170-3 in the table 150-3, as shown at step 325. Alternatively, depending on the query, other fields 170 pertaining to various links 150-2 (relations) and nodes 150-1 (manageable entities 120) may be sought. The exemplary templates 148 include templates for computing I/O path traversal, node path connectivity, shortest path and all paths between SAN nodes 120. Other templates may be defined.

Accordingly, the DBMS 138 traverses the manageable entities 120 (i.e. entries 170-1) sought in the query 144 by performing a database lookup in the managed object database 133 based on the match values, such that the traversal is performed without simultaneously loading each database entry 170 including the traversed manageable entities 120 into a data structure or other memory employed by the SAN management application 132, as depicted at step 326. The DBMS 138 thus loads database entries 170 in the query result 146 without loading traversed manageable entities 120 not satisfying the query, as disclosed at step 327. The management application 132 then computes and identifies a query response 142 for display to the user console 136 including manageable entities 150-1 and other related tables entries 170 identified during the traversal, as depicted at step 328.

Figures 8, 9:
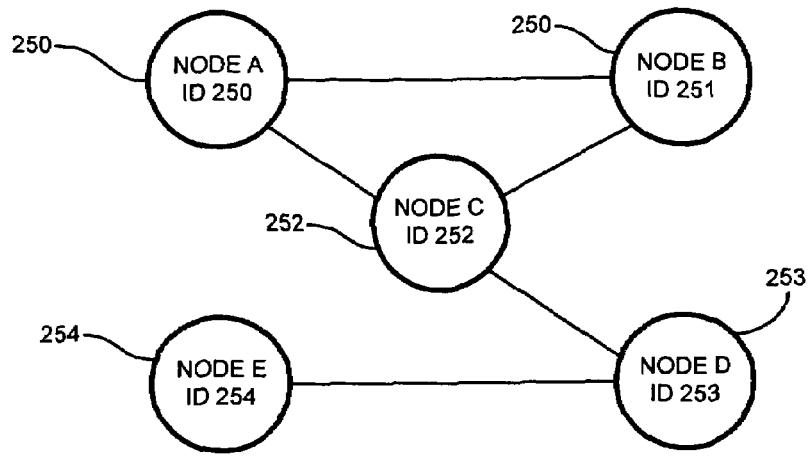
FIG. 8 is a graph of an exemplary topology in a storage area network.
FIG. 9 is an example representation as defined herein of the topology of FIG. 6.

FIG. 8 is a graph of an exemplary topology in a storage area network, and FIG. 9 is an exemplary representation as defined herein of the topology of FIG. 8. In the example configuration, the templates 148 correspond to SQL statements and receive match values that are inserted into the template 148 to generate an SQL query targeted at the desired topology fields 170. In the exemplary arrangement, an Oracle® database implementation is employed, employing a database management system (DBMS) marketed commercially by Oracle Corporation, of Redwood Shores, Calif. Alternate relational database management systems may also be employed in alternate configurations. Execution of the corresponding template 148 by the query processor 137 therefore issues a series of SQL statements to generate queries 144 that satisfy the request 140, as follows:

The exemplary connectivity check and shortest path traversals disclosed below are based on an abstract graph breath-first search (BFS) traversal and implemented as the stored PL/SQL procedure. Below is the example of the topology and description of the implemented traversal. Suppose that we have topology as shown in FIG. 8. The corresponding entries 170-11 . . . 170-20 for descriptions of the links for the above topology are listed in FIG. 9. Each link in the graph in FIG. 8 is described as a pair of vectors in FIG. 9. To describe the implementation of the shortest path search traversal (query), the query 144 sequence finds the shortest path between nodes A and E. The TOPOLOGY_TEMP table is used to store temporary data and form final output. A TOPOLOGY table (FIG. 9) identifies the directed vertices defining the connections (relations) in the SAN, and is a SQL representation of the link table 150-2. Temporary tables include the same fields as the TOPOLOGY table plus one additional field to indicate processing step number.

Step 1: get IDs of the start and end points. Our starting point is the point A with ID=250 end point is E with ID=254

Step 2: Get set of directly connected vertices.

INSERT INTO TOPOLOGY_TEMP

SELECT 1 as STEP, NODE_ID, REMOTE_NODE_ID, NAME FROM TOPOLOGY WHERE NODE_ID=250;

Result:

STEP, NODE_ID, REMOTE_NODE_ID, NAME 1, 250, 252, A 1, 250, 251, A

Step 3: Check if we have found end point already.

Is there any REMOTE_NODE_ID=254?

SELECT COUNT (*) FROM TOPOLOGY_TEMP WHERE REMOTE_NODE_ID=254 AND STEP=1;

Result: 0

Step 4: For each topology point that was selected at step 2, get set of the directly connected vertices and ensure avoiding any vertices which were already visited on any of the previous steps.

INSERT INTO TOPOLOGY_TEMP A

SELECT 2 as STEP, NODE_ID, REMOTE_NODE_ID, NAME FROM TOPOLOGY WHERE ID IN (SELECT REMOTE_NODE_ID FROM TOPOLOGY_TEMP WHERE STEP=1) AND

NOT EXISTS (SELECT 1 FROM TOPOLOGY_TEMP WHERE NODE_ID=A.NODE_ID AND STEP <2);

Result:

STEP, ID, REMOTE_ID, NAME 2, 251, 252, B 2, 252, 251, C 2, 252, 253, C

Step 5: Check if we have found end point.

SELECT COUNT (*) FROM TOPOLOGY_TEMP WHERE REMOTE_ID=254 AND STEP=1;

Result: 0

Step 6: Get all directly connected vertices using last retrieved data set.

INSERT INTO TOPOLOGY_TEMP A

SELECT 3 as STEP, NODE_ID, REMOTE_NODE_ID, NAME

FROM TOPOLOGY WHERE NODE_ID IN (

SELECT REMOTE_NODE_ID FROM TOPOLOGY_TEMP WHERE STEP=2

) AND

NOT EXISTS (SELECT 1 FROM TOPOLOGY_TEMP WHERE

NODE_ID=A.NODE_ID AND STEP <3);

Result:

STEP, NODE_ID, REMOTE_NODE_ID, NAME 3, 253, 254, D

Step 7: Check if we have found end point.

SELECT COUNT (*) FROM TOPOLOGY_TEMP WHERE REMOTE_NODE_ID=254 AND STEP=3;

Result: 1

Step 8: Clean temporary table from "dirty" paths. Temporary table has following rows:

STEP, NODE_ID, REMOTE_NODE_ID, NAME 1, 250, 252, A 1, 250, 251, A 2, 251, 252, B 2, 252, 251, C 2, 252, 253, C 3, 253, 254, D

DELETE TOPOLOGY_TEMP WHERE STEP=3 AND REMOTE_NODE_ID ◊ 254; No rows deleted.

DELETE TOPOLOGY_TEMP WHERE STEP=2 AND

REMOTE_NODE_ID NOT IN (SELECT NODE_ID FROM TOPOLOGY_TEMP WHERE STEP=3);

STEP, NODE_ID, REMOTE_NODE_ID, NAME 1, 250, 252, A 1, 250, 251, A 2, 252, 253, C 3, 253, 254, D

DELETE TOPOLOGY_TEMP WHERE STEP=1 AND

REMOTE_NODE_ID NOT IN (SELECT NODE_ID FROM TOPOLOGY_TEMP WHERE STEP=2);

STEP, NODE_ID, REMOTE_NODE_ID, NAME 1, 250, 252, A 2, 252, 253, C 3, 253, 254, D

Final dataset within TOPOLOGY_TEMP table now presents shortest path between A and E:

A (250,252)→C(252,253)→D(253,254)→E(254)

The traversal continues as above until end point is found or while no new links are saved in the temporary table.

All Paths example:

All Paths algorithm is based on the Oracle RDBMS built-in operation CONNECT BY and implemented as the stored PL/SQL procedure. The CONNECT BY operation navigates through hierarchical data sets. Because the topology graph may be treated as a union of multiple tree hierarchies, the "connect by" functionality lends itself well. A particular potential functional difference between a tree and a topology graph is the existence of the "dead loops" within a topology. The predetermined CONNECT BY operation provides detection and possibility of ignorance of the "dead loop" during the processing. We are using that ignorance functionality to achieve our goals.

Using the same topology as in the Shortest Path example above we will retrieve all paths between E and A. To do so we simply need to read all tree brunches starting with node E and then keep only brunches where last element equals to A:

SELECT PATH FROM (

SELECT DISTINCT NODE_ID, REMOTE_NODE_ID, connect_by_root NAME||sys_connect_by_path ((SELECT DISTINCT NAME FROM TOPOLOGY WHERE NODE_ID=a.REMOTE_NODE_ID),'→') path FROM TOPOLOGY a

CONNECT BY NOCYCLE PRIOR REMOTE_NODE_ID=NODE_ID START WITH ID=250

) WHERE REMOTE_NODE_ID=254

AND INSTR(PATH,SUBSTR(PATH,1,INSTR(PATH,'→', 1,1)),1,2)=0;

Because we operate with vectors, Oracle creates paths with both vectors between two nodes at the same time (A→B and B→A). The INSTR(PATH,SUBSTR(PATH,1,INSTR (PATH,'→',1,1)),1,2)=0 condition cleans output from such paths.

Those skilled in the art should readily appreciate that the programs and methods for querying large networks as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The disclosed method may be in the form of an encoded set of processor based instructions for performing the operations and methods discussed above. Such delivery may be in the form of a computer program product having a computer readable medium operable to store computer program logic embodied in computer program code encoded thereon, for example. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for querying large networks has been particularly shown and described with references to embodiments thereof, it will be understood by those skilled in the art that various changes in form and details may be made therein without departing from the scope of the invention encompassed by the appended claims.

What is claimed is:

1. A method of querying large networks comprising:
defining a set of tables indicative of node and relation structures;
traversing a network of interconnected nodes to identify manageable entities in the network and relations between the manageable entities;
populating the defined set of tables from the traversal to generate a topology of the network, populating the tables further including:
enumerating each of the nodes found; and
enumerating a relation table indicative of a relation between each of the enumerated nodes; and
traversing the topology by processing a query of the defined set of tables, the traversal avoiding simultaneous memory residence of the representations of interconnected manageable entities, the traversing performed without simultaneously loading each database entry including the traversed manageable entities, processing the query including defining a query template, further comprising:
identifying manageable entity types sought in the query;
enumerating match values corresponding to the identified manageable entities;
identifying relations to other manageable entities from the identified manageable entity types; and
enumerating match values of the manageable entities corresponding to the identified relations.

2. The method of claim 1 wherein the tables define a topology of network nodes, each of the nodes having at least one link to another node, each link denoting an identified relation between manageable entities, further comprising:
identifying, for a particular node, a type of node;
computing relations to other nodes from the particular node;
identifying connections from the particular node to other nodes, each relation defining a connection; and
determining, for each identified connection, a type of the connection.

3. The method of claim 2 wherein the network is a storage area network (SAN) and nodes define manageable entities in the SAN, the manageable entities including storage devices, connectivity devices, and host devices, further comprising:
identifying a particular node as one of a storage device, connectivity device and host device;
computing other manageable entities connected to the identified node; and
storing an entry in the relation table for each of the computed connections.

4. The method of claim 3 further comprising:
storing the nodes as node entries in a table;
storing the relations as link entries in a table;
classifying the node entries in a node type table; and
classifying the link entries in a link type table, the link entries indicative of a directional association between the node entries, the node entries and link entries collectively depicting a storage area network topology responsive to the query, the query based on the tables.

5. The method of claim 1 wherein traversing the topology is responsive to the query, further comprising:
receiving a template indicative of the query, each query corresponding to a particular set of relations defined by at least one of the set of tables;
receiving match values indicative of a set of results, the results indicative of at least one of nodes and relations, the match values operable for comparison with values in the set of tables;
employing the match values in the template for identifying corresponding values in the table; and
performing the queries in the template to compute a result set of table entries, the result set indicative of a set of nodes and relations responsive to the query.

6. The method of claim 5 wherein the match values correspond to SAN entities sought in the query, the match values including range values indicative of a continuum of values in corresponding table entries.

7. The method of claim 1 further comprising processing the query without loading data structures corresponding to each relation and manageable entity considered in processing the query.

8. The method of claim 7 further comprising defining a navigation template indicative of a particular subset of the topology, the navigation template responsive to values assigned to filtering attributes for denoting the particular subset of the topology.

9. The method of claim 1 further comprising:
defining a graphical user interface that receives match values; and
receiving match values sought by the query via the GUI.

10. The method of claim 9 further comprising:
defining the query, the query including the enumerated match values, the match values corresponding to database entries containing the manageable entities;
traversing the manageable entities sought in the query by performing a database lookup based on the match values; and
identifying a query response including manageable entities identified during the traversal.

11. The method of claim 10 further comprising:
loading database entries in the query response without loading traversed manageable entities not satisfying the query.

12. The method of claim 11 wherein the template includes match values and statements, the statements indicative of conditional selection based on the match values, wherein the link table is indicative of paths between nodes, corresponding to at least one of I/O path traversal, node path connectivity, shortest path or all paths.

13. A SAN management server for querying topology of large storage area networks comprising:
a set of tables indicative of node and relation structures;
a san management application that traverses a network of interconnected nodes to identify manageable entities in the network and relations between the manageable entities;
a database management system that populates the defined set of tables from the traversal to generate a topology of the network; and a query processor that traverses the topology by processing the query of the defined set of tables, the traversal avoiding simultaneous memory residence of the representations of interconnected manageable entities, the traversal performed without simultaneously loading each database entry including the traversed manageable entities, the set of tables defining a topology of network nodes, each of the nodes having at least one link to another node, each link denoting an identified relation between manageable entities, the query processor further:

traversing the topology responsive to the query;

receiving a template indicative of the query, each query corresponding to a particular set of relations defined by at least one of the set of tables;

receiving match values indicative of a set of results, the results indicative of at least one of nodes and relations, the match values operable for comparison with values in the set of tables;

employing the match values in the template for identifying corresponding values in the table; and performing the queries in the template to compute a result set of table entries, the result set indicative of a set of nodes and relations responsive to the query, wherein the match values correspond to SAN entities sought in the query and the match values include range values indicative of a continuum of values in corresponding table entries, the queries performed by loading database entries in the query response without loading traversed manageable entities not satisfying the query, further comprising a topology processor operable to:

identifying, for a particular node, a type of node;

computing relations to other nodes from the particular node;

identifying connections from the particular node to other nodes, each relation defining a connection;

determining, for each identified connection, a type of the connection;

storing the nodes as node entries in a table in a managed object database storing the set of tables;

storing the relations as link entries in a table in the managed object database;

classifying the node entries in a node type table; and classifying the link entries in a link type table, the link entries indicative of a directional association between the node entries, the node entries and link entries collectively depicting a storage area network topology responsive to the query based on the tables.

14. The server of claim 13 further comprising a query template, the query processor further:

identifying manageable entity types sought in the query;

enumerating match values corresponding to the identified manageable entity types;

displaying a graphical user interface operable to receive match values receiving match values sought by the query via the GUI;

identifying relations to other manageable entities from the identified manageable entity types; and enumerating match values of the manageable entities corresponding to the identified relations.

15. The server of claim 13 wherein the query processor further:

defining the query, the query including the enumerated match values, the match values corresponding to database entries containing the manageable entities;

traversing the manageable entities sought in the query by performing a database lookup based on the match values; and identifying a query response including manageable entities identified during the traversal, the template including match values and statements, the statements indicative of conditional selection based on the match values, wherein the link table is indicative of paths between nodes, corresponding to at least one of I/O path traversal, node path connectivity, shortest path or all paths.

16. A computer program product having a non-transitory computer readable storage medium that stores computer program logic embodied in computer program code encoded thereon as an encoded set of processor based instructions that, when executed by a computer, cause the computer to perform a topology query in a storage area network comprising:

computer program code for defining a set of tables indicative of node and relation structures;

computer program code for traversing a network of interconnected nodes to identify manageable entities in the network and relations between the manageable entities;

computer program code for populating the defined set of tables from the traversal to generate a topology of the network, populating the tables further including:

enumerating each of the nodes found; and enumerating a relation table indicative of a relation between each of the enumerated nodes; and computer program code for traversing the topology by processing a query of the defined set of tables, the traversal avoiding simultaneous memory residence of the representations of interconnected manageable entities by traversing without simultaneously loading each database entry including the traversed manageable entities processing the query including defining a query template, further comprising:

identifying manageable entity types sought in the query;

enumerating match values corresponding to the identified manageable entities;

identifying relations to other manageable entities from the identified manageable entity types; and enumerating match values of the manageable entities corresponding to the identified relations;

computer program code for defining a query including at least one enumerated match value, the match values corresponding to database entries containing the manageable entities;

computer program code for traversing the manageable entities sought in the query by performing a database lookup based on the match values, the traversal performed without simultaneously loading each database entry including the traversed manageable entities; and computer program code for generating a query response including manageable entities identified during the traversal.

17. The method of claim 5 wherein avoiding simultaneous memory references relieves the management application of the memory burden otherwise associated with the query, the match values including range values indicative of a continuum of corresponding table entries.

18. The method of claim 17 wherein the match values received from the GUI are inserted into the match values in the query for matching against the fields in the db tables.

19. The method of claim 18 further comprising avoiding loading traversed manageable entities not satisfying the match terms in the query.

* * * * *